United States Patent [19]
Helm

[11] 3,970,837
[45] *July 20, 1976

[54] MAGNETIC LIGHT ASSEMBLY

[76] Inventor: Leon E. Helm, Villa Grove, Ill. 61956

[ * ] Notice: The portion of the term of this patent subsequent to Nov. 12, 1991, has been disclaimed.

[22] Filed: Mar. 18, 1974

[21] Appl. No.: 451,887

Related U.S. Application Data

[62] Division of Ser. No. 290,231, Sept. 18, 1972, Pat. No. 3,848,227.

[52] U.S. Cl............................. 240/52.15; 240/8.3; 240/57
[51] Int. Cl.².................. F21L 15/16; F21L 25/00; B60Q 1/00
[58] Field of Search............... 240/7.1 A, 8.3, 52.15, 240/57; 340/74, 84, 87, 89, 119

[56] References Cited
UNITED STATES PATENTS

| | | | |
|---|---|---|---|
| 2,230,521 | 2/1941 | Bolser | 340/119 X |
| 2,486,476 | 11/1949 | Kelley | 340/87 |
| 3,258,232 | 6/1966 | Nestegard | 248/206 A X |
| 3,440,748 | 4/1969 | Hackley | 248/206 A X |
| 3,451,709 | 6/1969 | Swauger | 248/206 A X |
| 3,474,411 | 10/1969 | Collins | 240/52.15 X |
| 3,678,266 | 7/1972 | Fradette | 240/8.3 X |
| 3,691,366 | 9/1972 | Spreuer | 240/8.3 |
| 3,848,227 | 11/1974 | Helm | 340/74 |

*Primary Examiner*—Fred L. Braun
*Attorney, Agent, or Firm*—Woodard, Weikart, Emhardt & Naughton

[57] ABSTRACT

A light assembly which is magnetically attachable to a vehicle having a curved metal surface. A plurality of metal brackets are fixedly attached by means of rivets to a flexible elongated magnetic member. Lights are mounted to the brackets. A flexible covering is adhesively secured to the magnetic member covering portions of the brackets and rivets as well as the electrical wires positioned between the covering and member. A ground wire is connected to and between each rivet head and its associated bracket, thereby grounding the light through the bracket. The lights are also connected to a source of power through another wire positioned between the member and covering. An external cable is mounted to a vehicle by magnetic pads with each pad having a covering adhesively secured thereto with the cable extending between the covering and the pad.

2 Claims, 7 Drawing Figures

MAGNETIC LIGHT ASSEMBLY

This is a division, of application Ser. No. 290,231, filed Sept. 18, 1972 U.S. Pat. No. 3,848,227.

BACKGROUND OF THE INVENTION

1. Field of the Invention

This invention is in the field of light attaching devices.

2. Description of the Prior Art

Many types of mounting devices have heretofore been proposed for use particularly in mounting signs or lights to vehicles. Examples of these prior art devices are disclosed in the following U.S. Pat. Nos. 3,230,653 issued to F. E. Rice; 3,258,232 issued to S. C. Nestegard; 3,440,748 issued to J. C. Hackley; and 3,474,411 issued to C. E. Collins. Another similar device which is a magnetic holder is disclosed in the U.S. Pat. No. 3,195,022 issued to E. F. Staver. Most vehicles have curved surfaces at the desired location for the mounting of the light or sign. Thus, if the light or sign is not provided as original equipment with the vehicle, then substantial modification of the vehicle is required such as drilling various holes through the vehicle walls in order to secure the light or sign to the curved surface of the vehicle. A solution to this problem is to utilize a flexible magnetic sheet which will conformingly attach to a curved metal surface such as found on a vehicle. The apparatus disclosed herein is provided with such a flexible magnetic sheet.

A major problem occurs in securing the electrical wires to lights which are mounted to a flexible magnetic sheet. Typically, the wires are secured to the magnetic sheet by adhesives but will eventually extend freely through the air from the magnetic sheet to the electrical light. The solution to this problem such as in the apparatus disclosed herein solves this problem by electrically connecting the light to the mounting bracket which is secured to the magnetic sheet with the mounting bracket in turn being electrically connected to the electrical wire by means of the fastener securing the bracket to the magnetic sheet. A flexible covering may therefore be secured to the magnetic sheet, thereby covering the electrical wiring, the fasteners securing the mounting bracket to the magnetic sheet and portions of the mounting bracket.

The apparatus disclosed herein also provides flexible magnetic pads securable to a vehicle. The electrical cable connecting the light assembly to the source of electrical power is then attached to the magnetic pads by means of covers secured to the pads. The complete apparatus including the light assembly and the magnetic pads for attaching the cable may be quickly and easily mounted and de-mounted from a vehicle.

SUMMARY OF THE INVENTION

One embodiment of the present invention includes an apparatus comprising a flat elongated magnetic member constructed of resilient permanent magnetic material which will conformingly and magnetically attach to a curved metal surface, a plurality of electrical wires mounted across the member, and an elongated flexible covering secured to the member sandwiching and holding the wires between the member and the covering.

It is an object of the present invention to provide a new and improved light assembly which is easily attachable to a metal curved surface.

It is another object of the present invention to provide new and improved means for mounting a cable to a metal curved surface.

In addition, it is an object of the present invention to provide a light assembly which has new and improved means for connecting and securing electrical wires of the assembly.

Related objects and advantages of the present invention will be apparent from the following description.

DESCRIPTION OF THE PREFERRED EMBODIMENT

Figure 1:
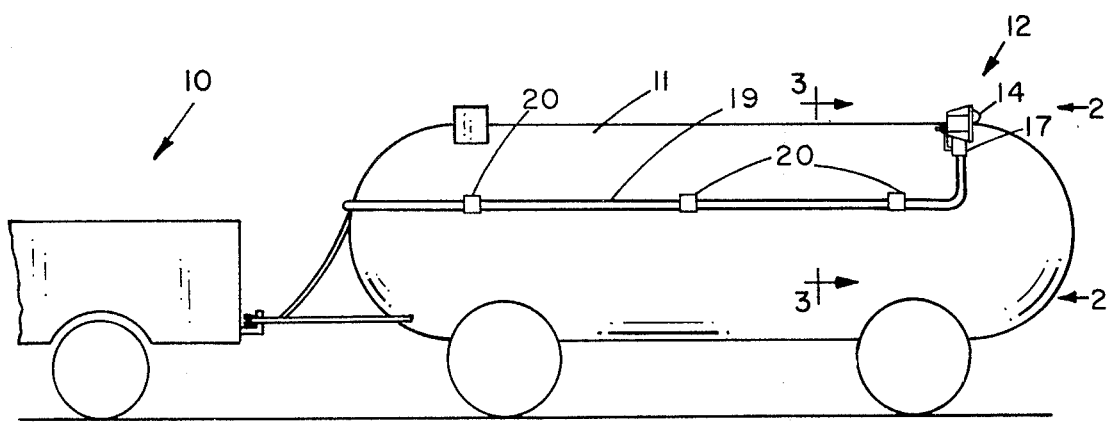
FIG. 1 is a fragmentary perspective view of a vehicle and trailer having the apparatus incorporating the present invention mounted thereon.
Figure 2:
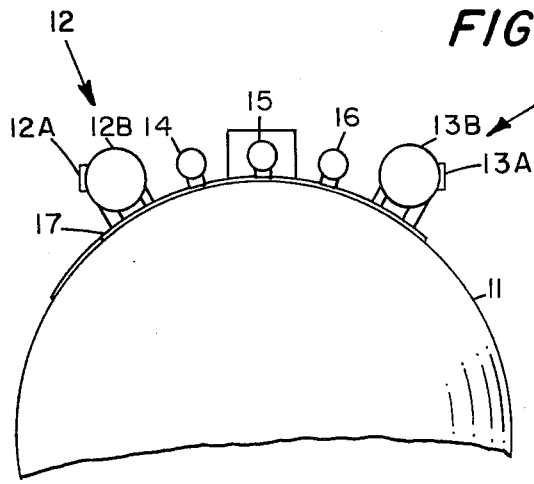
FIG. 2 is an enlarged fragmentary end view looking in the direction of arrows 2—2 of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a truck 10 towing a second vehicle 11. Vehicle 11 may take a variety of forms and configurations; however, the vehicle shown is a gas tank. To insure the integrity of the gas tank, it is desirable not to drill holes into the tank for the mounting of warning lights which in many areas are required by law. Thus, a light assembly is secured to the metallic tank by means of a magnet. Likewise, the electrical cable 19 connecting the lights to a source of electrical energy within truck 10 is secured to tank 11 by means of magnetic pads 20.

Figure 5:
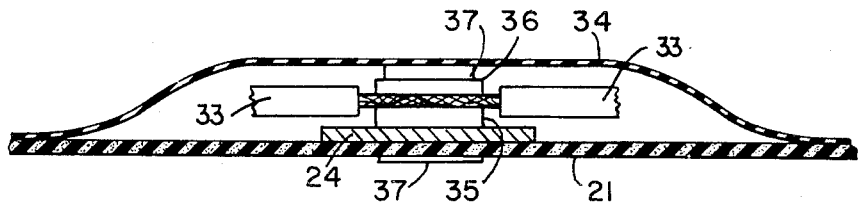
FIG. 5 is a fragmentary and enlarged cross-sectional view taken along the line 5—5 of FIG. 7 and viewed in the direction of the arrows with covering 34 mounted thereatop.

The light assembly includes three brake light 14, 15 and 16 plus two combination brake and turn lights 12 and 13. The lights are mounted to brackets which in turn are fixedly secured to a flat elongated magnetic member 21 (FIG. 5) which is constructed of resilient permanent magnetic material for conformingly and magnetically attaching to a curved metal surface. An elongated flexible covering 34 is secured to member 21 by an adhesive sandwiching and holding a plurality of electrical wires 30 through 33 between member 21 and covering 34.

Figure 7:
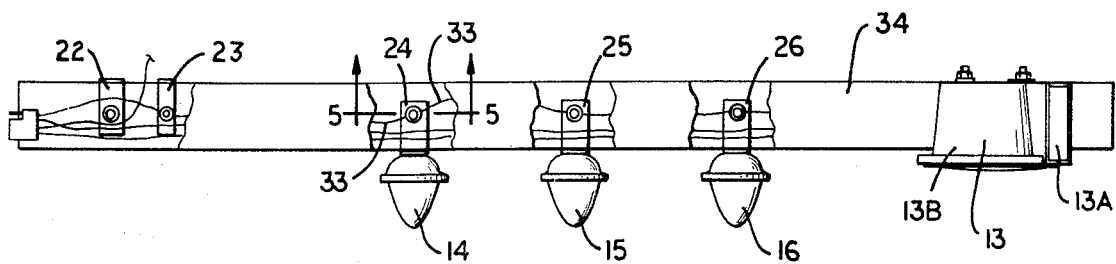
FIG. 7 is a top fragmentary and enlarged view of the light assembly shown in FIG. 1.

Combination lights 12 and 13 include brake lights 12A and 13A and turn signal lights 12B and 13B. Brake lights 14, 15 and 16 are secured to brackets 24, 25 and 26 which are secured to member 21 by rivets. Combination lights 12 and 13 are mounted respectively to brackets 22, 23, 27 and 28 also fixedly secured to member 21 by rivets. A variety of different types of brake lights and combination lights may be utilized. In one embodiment, combination lights 12 and 13 were produced by Peterson Manufacturing Company of Kansas City, Missouri under Model No. PM-5555. As shown in FIG. 1, the housings of the combination lights are mounted to two brackets with light 12 being mounted to brackets 22 and 23 and light 13 being mounted to brackets 27 and 28. Bracket 24 (FIG. 7) is positioned immediately adjacent rivet. 21 with the other leg of the bracket extending away from the edge of member 21 and positioned perpendicularly with respect to the main body of member 21. A rivet 37 (FIG. 5) extends through bracket 24, and member 21 with the opposite end of the rivet being enlarged to secure the bracket to the magnetic member. A pair of metal flat washers 35 and 36 are positioned between one end of the rivet and bracket 24 with the bare exposed and uninsulated portion of wire 33 extending between washers 35 and 36. Thus, by riveting the washers and bracket along with the wire to member 21, an electrical connection is made between bracket 24 and wire 33. One side of light 14 is electrically connected to bracket 24 and is therefore electrically connected to wire 33 which is insulated between brackets. The other side of light 14 is connected to wire 30. In a similar manner, one side of each light 15 and 16 is electrically connected via brackets 25 and 26 and their associated rivet to wire 33 while the other side of lights 15 and 16 are connected to wire 30. Covering 34 is then adhesively secured to member 21 covering the wires as well as the rivet and one leg of each mounting bracket. The mounting brackets must be produced from metal in order to assure for the electrical connection between the lights and wire 33. The opposite ends of the rivets must be forced so as to tightly grip wire 33 between the pairs of washers. Wire 33 is insulated in all locations with the exception of where the wire passes between pairs of washers on each mounting bracket rivit.

Brake lights 12A and 13A are mounted to brackets 22 and 28 which are secured by rivets to member 21. Pairs of washers are provided between one end of each mounting bracket 22 and 28 and its associated rivet end so as to electrically connect wire 33 to mounting bracket 22 and brake light 12A and mounting bracket 28 and brake light 13A. The other sides of brake lights 12A and 13A are connected to wire 30. Thus, by connecting wires 30 and 33 across a source of electrical energy, the brake lights 12A, 13A, 14, 15 and 16 will be activated. Brackets 23 and 27 are not electrically connected directly to any wire but instead are secured to member 21 to provide additional support for lights 12 and 13.

Turn signal light 12B is mounted within the combination light 12 and is electrically connected to wire 32 and wire 30. Likewise, turn signal light 13B is mounted within combination light 13 and is connected to wires 30 and 31. Wire 30 may be connected to a source of electrical energy, with wires 31 and 32 being connected to the turn signal switch within vehicle 10, thereby allowing for the connection of the lights 12B and 13B to a source of electrical energy. A suitable four wire connector 29 is positioned between member 21 and covering 34 and is connected to wires 30 through 33.

Figure 3:
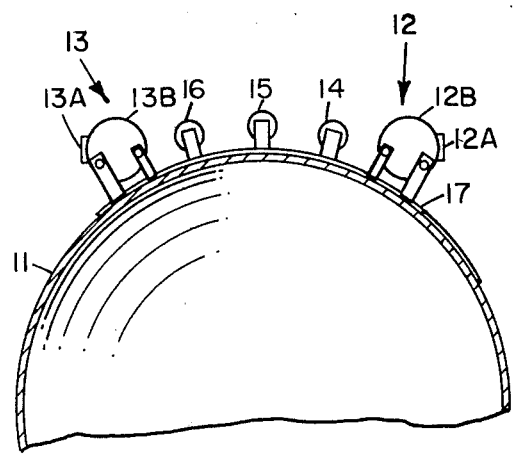
FIG. 3 is an enlarged fragmentary cross-sectional view taken along the line 3—3 of FIG. 1 and viewed in the direction of the arrows.
Figure 4:
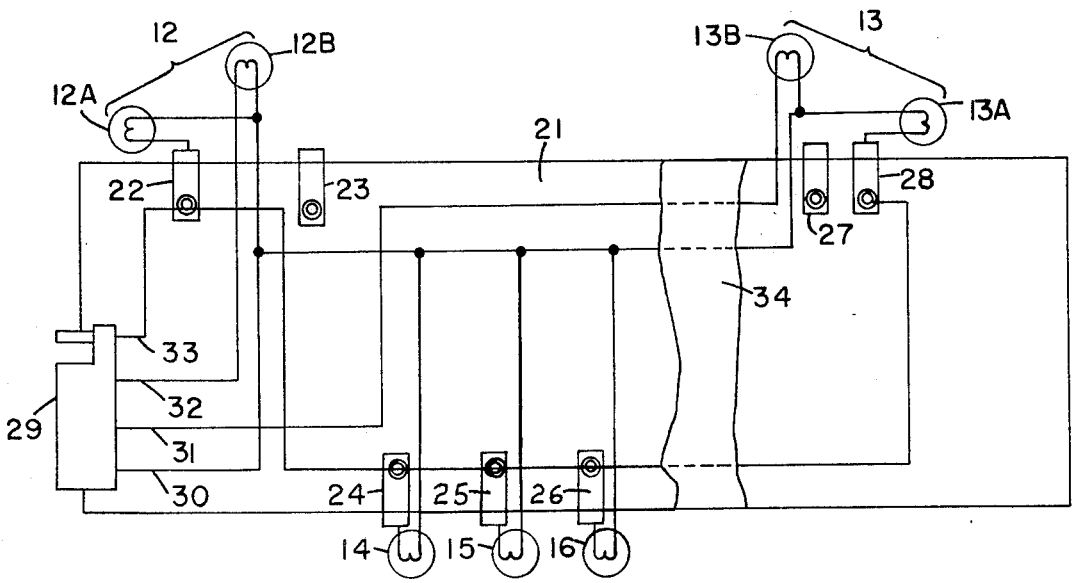
FIG. 4 is a schematic representation of the electrical circuitry of the light assembly shown in FIG. 1.

Connector 29 is connected to a similar connector attached to the end of cable 19 (FIG. 1) which connects the four wires from the light apparatus to a source of electrical energy within truck 10. It should be noted that conductor 29 is mounted between member 21 and covering 34 and protrudes outwardly therefrom in order to facilitate the connection to the connector on the end of cable 19. Cable 19 is a flexible tube which is attached to the magnetic pads 20 positionable along the length of vehicle 11. Magnetic pads 20 have a magnetic sheet identical to sheet 21 (FIG. 3) and also include a covering identical to covering 34 with the covering adhesively secured to the magnetic sheet and the cable extending between the magnetic sheet and coverings.

Figure 6:
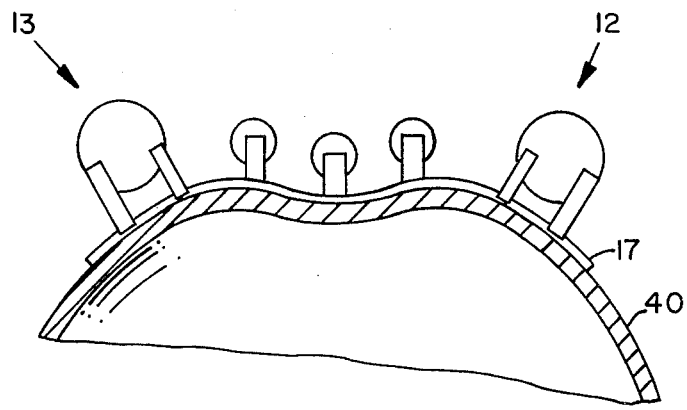
FIG. 6 is a fragmentary view of a vehicle with an irregular configured surface having the light assembly mounted thereon.

It will be obvious from the above description that the light apparatus may be utilized for mounting on various gas tanks and also on other vehicles including boat trailers and house trailers. Other vehicles include farm wagons and flatbed trucks as well as automobiles which are being towed. The connection of the ground wire 33 to the mounting brackets is particularly advantageous in that additional connectors or connections such as solder joints are not required. It should be noted that the magnetic sheet member 17 will adhere to metal walls which have irregular shapes such as the irregular shaped wall 40 shown in FIG. 6.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:
1. A light fixture apparatus comprising:
a flexible magnetic member which can be conformingly and magnetically attached to a curved metal surface;
a plurality of electrical wires including a first wire and a second wire mounted across said member;
means operable to hold said wires on said member;
a metal bracket fixedly mounted on said member;
fastening means securing said bracket to said member and electrically connected directly to said first wire;
a first light mounted on said bracket and electrically connected to said first wire by said bracket and said fastening means and electrically connected to said second wire;
a second light mounted on said member and electrically connected to at least said second wire;
a magnetic pad having a magnetic sheet and covering adhesively secured together; and,
a flexible cable extending between said magnetic sheet and said covering, said cable hving additional electrical wires connected to said first light.
2. A light fixture apparatus comprising:
a flexible magnetic member which can be conformingly and magnetically attached to a curved metal surface;
a plurality of electrical wires including a first wire and a second wire mounted across said member;
means operable to hold said wires on said member;
a metal bracket fixedly mounted to said member;

fastening means securing said bracket to said member and electrically connected directly to said first wire;

said fastening means including a first metal fastener mounting said bracket to said member and electrically connected directly to said first wire;

a first light mounted on said bracket and electrically connected to said first wire by said bracket and said fastening means and electrically connected to said second wire;

a second light mounted on said member and electrically connected to at least said second wire;

a second metal bracket mounted on said member, said second light being mounted on and electrically connected to said second bracket; and, said fastening means further including a second metal fastener mounting said second bracket to said member and electrically connected directly to said first wire;

wherein said first and second fasteners each include a pair of flat metal washers with said first wire gripped between each of said pair of washers, said first wire being uninsulated at least at the portions where it is gripped by said washers.

* * * * *